United States Patent [19]

Hopkins, Jr.

[11] Patent Number: 4,568,701

[45] Date of Patent: Feb. 4, 1986

[54] POLYISOCYANURATE FOAMS OF IMPROVED FRIABILITY AND PROCESS OF PREPARING SAME

[75] Inventor: Henry S. Hopkins, Jr., Ashland, Ohio

[73] Assignee: General Latex and Chemical Corporation, Cambridge, Mass.

[21] Appl. No.: 658,232

[22] Filed: Feb. 17, 1976

[51] Int. Cl.⁴ .......................................... C08G 18/14
[52] U.S. Cl. .................................. 521/112; 521/118; 521/130; 521/131
[58] Field of Search ............... 260/2.5 AW, 2.5 AH, 260/2.5 AM; 521/112, 130, 118, 131

[56] References Cited

U.S. PATENT DOCUMENTS

| | | | |
|---|---|---|---|
| 2,834,748 | 5/1958 | Bailey et al. | 528/29 |
| 2,917,480 | 12/1959 | Bailey et al. | 528/27 |
| 3,634,345 | 1/1972 | Diehr et al. | 260/2.5 AW |
| 3,799,896 | 3/1974 | Moss | 260/2.5 AW |
| 3,872,035 | 3/1975 | Papa et al. | 260/2.5 AW |
| 3,940,517 | 2/1976 | De Leon | 260/2.5 AW |
| 3,981,828 | 9/1976 | Demou et al. | 260/2.5 AW |
| 3,981,829 | 9/1976 | Cenker et al. | 260/2.5 AW |

FOREIGN PATENT DOCUMENTS

| | | | |
|---|---|---|---|
| 1184080 | 12/1964 | Fed. Rep. of Germany | 260/77.5 AP |
| 1374574 | 8/1964 | France | 260/77.5 AP |
| 1006784 | 10/1965 | United Kingdom | 260/77.5 AP |
| 262392 | 5/1970 | U.S.S.R. | 260/77.5 AP |

Primary Examiner—Maurice J. Welsh
Attorney, Agent, or Firm—Richard P. Crowley

[57] ABSTRACT

In a process of preparing a polyisocyanurate foam, which process comprises: reacting a plasticized polyisocyanate in the presence of a trimerization catalyst and an expanding amount of an inert blowing agent to provide a polyisocyanurate foam, the improvement which comprises: carrying out the reaction in the presence of from about four to twenty percent by weight of a surface-active organic silicone compound characterized by an active hydrogen functionality, and having a hydroxyl number of greater than about 30 and an equivalent weight of less than about 2000 and in the presence of a nonvolatile plasticizer to provide a polyisocyanurate foam of improved friability and good flame, heat and stability properties.

21 Claims, No Drawings

POLYISOCYANURATE FOAMS OF IMPROVED FRIABILITY AND PROCESS OF PREPARING SAME

BACKGROUND OF THE INVENTION

Polyisocyanates, such as aliphatic and aromatic isocyanates like diisocyanates, have been polymerized in the presence of a trimerization catalyst to provide rigid polyisocyanurate foams. The polyisocyanate trimerization reaction has been carried out in bulk and in solution to provide essentially cross-linked, very brittle and very friable foam products. The foam products are produced by combining polyisocyanate, an inert blowing agent, such as a low-boiling-point liquid like halocarbons, and one or more trimer catalysts like a tertiary amine, and heating to effect the polyisocyanurate reaction. Typically, the reaction is exothermic with the admixing of a two-component mixture of the isocyanate with the catalyst and blowing agent, and no additional heating is required. The polyisocyanurate foams produced to date have not been commercially acceptable, and have been characterized by high brittleness and high friability. Brittleness refers to the internal friability of the foam structure which remains essentially unchanged with time; that is, it is structural and molecular in nature, while friability refers to the state of the surface of the polyisocyanurate foam; that is, the powderability of the surface when subject to pressure, which friability changes with time.

Attempts to reduce the friability of polyisocyanurates have been made by modification of the polyisocyanurate principally through the introduction of other chemical linkages, or by the addition of plasticizing compounds to the modified or trimer foams. Such chemical and additive modifications typically cause undesirable property changes in the resultant modified foam product, such as a reduction in flame and/or temperature and heat resistance and in dimensional stability of the foam products at low and/or high temperatures.

Epoxy-modified isocyanurates have not been commercially acceptable, since they are expensive, and the reaction is difficult to control and the materials exhibit limited processing properties. Imide-modified isocyanurates are very thermally stable with high thermal conductivity, but also are prepared from expensive raw materials. Carbodiimide-modified isocyanurates also are expensive and the reaction is difficult to control. The present-day, best, commercial products are the urethane-modified isocyanurate products which reduce friability through polyol or plasticizer modification, but which increases flammability, heat distortion and weight loss from exposure to high temperature and distortion due to humidity and aging.

In the preparation of such polyisocyanurates; i.e., trimer foams consisting essentially of recurring cross-linked isocyanurate units and the modified polyisocyanurates, a wide variety of trimer catalysts and combinations have been suggested and used (see, for example, U.S. Pat. Nos. 3,487,080; 3,723,364; 3,736,298; and 3,759,916, and *Modern Plastics Encyclopedia*, 1975–1976, pages 124 and 125, incorporated by reference). Such trimer catalysts have included tertiary amines, such as N,N'-dialkylaminoalkyl phenols and the like.

In the production of polyisocyanurate foams, both of the trimer and modified type, a surfactant is typically employed in very small amounts; e.g., usually under 1% by weight, to act as a cell-control additive and foam stabilizer. One class of surfactant compounds so employed have been silicone-glycol-type surfactants.

It is, therefore, most desirable to provide both trimer and modified polyisocyanurate foams which have low or acceptable friability while retaining the other desirable properties of such foams, and methods of preparing such foams.

SUMMARY OF THE INVENTION

My invention relates to polyisocyanurate foams of enhanced and improved friability and to the composition for and the process of preparing such foams.

In particular, my invention concerns polyisocyanurate trimer foams and the composition for and the process of reducing the friability and brittleness of such trimer foams without substantial sacrifice in the flame, heat and/or stability properties of such foam products. In addition, my invention is directed to modified polyisocyanurate foams and the composition for and the process of preparing such foams which exhibit an improvement in flammability properties.

My invention comprises a polyisocyanurate foam which contains an organic silicone compound with active hydrogen functionality and preferably hydroxyl or secondary amino groups. I have found that such silicone compounds of the type employed as surfactants with urethane resins and having a hydroxyl number of greater than 30; for example, 70 to 120 and an equivalent weight of less than about 2,000; for example, 450 to 800, are best suited for the purposes of my invention. I have found that polysiloxane and polysilozane compounds which have no or a very low hydroxyl number; e.g., less than 50; e.g., 30, are not as suitable for the purposes of my invention, and, when employed in my process, produce polyisocyanurate foams with little, if any, reduction in friability or brittleness properties.

The addition to and use of sufficient amounts of such silicone compounds to the composition for and in the process of preparing polyisocyanurate foams provide for trimer foams of considerably and unexpectedly reduced friability and brittleness with little, if any, substantial reduction in the heat or stability properties of the resulting foam. Further, the addition to and the use of such silicone compounds in modified polyisocyanurate foams, such as those plasticized or polyol modified foams, provide for an improvement in the flammability properties of the foam, with a reduction in the amount of polyol and/or organic plasticizer required to reduce the friability and brittleness of such foams.

The silicone compounds useful in my foam composition and process are represented by the surfactant-type organic silicone compounds, and particularly by the polysiloxane compounds. Such surfactant-type silicone compounds are well known in the urethane and other fields and are used as cell-control and foam stabilizers at very low concentration levels which are insufficient to provide the unexpected and surprising advantages when used at higher levels in polyisocyanurate foams for different purposes.

One preferred class of polysiloxane compounds useful in my invention includes the silicone-polyol; e.g., silicone-glycol, surfactants or surface-active compounds which are hydrolytically stable and are soluble in the polyisocyanurate employed in the process. Such polysiloxane compounds include, but are not limited to, the copolymeric polyoxy alkylene; e.g., polyethylene oxide and polypropylene oxide, polysiloxanes, such as those having an average molecular weight of about 300 to 3000, and ranging from about 30 to 100 ethylene oxide and the remainder propylene oxide, with about 2 to 30% of polyalkyl siloxy groups, such as dimethyl siloxy groups. Some polysiloxane compounds useful in my invention also are described and include silicone polyether copolymers composed of methyl polysiloxane and polyoxyalkylene; e.g., $C_2$-$C_3$ ethers. Suitable polysiloxane compounds are described in U.S. Pat. No. 3,511,788, incorporated by reference herein.

I have found that nonhydrolyzable silicone compounds with C—Si:bonds appear to provide better humid aging characteristics than more hydrolyzable compounds with C—O—Si:bonds. In addition, I have discovered that hydroxyl side-chain functionality appears better than amino side-chain functionality. The primary use of silicone compounds of this type is as surfactants in the urethane foam industry. Examples of suitable commercially available surfactant compounds are Dow Corning compounds known as DC-193 and DC-195 and Union Carbide compounds known as L-5420.

Although not wishing to be bound by any theory, it is my present belief that the reactive functionality in the surfactant-like silicone compounds is incorporated into the polyisocyanurate foam structure interrupting the high cross-link density of the isocyanurate by forming urethane and urea-type linkages in the foam. Apparently, the silicon increases the heat stability of the modified urethane and urea linkages. The amount of silicon compound necessary on an equivalent basis to reduce the friability of an isocyanurate is remarkably small, since the resulting foams have NCO/OH indices between 1500 and 25,000 (based on extremes of 20 pts. by weight of a 100 OH# material and 3 pts. by weight of a 30 OH# material). Furthermore, my process can be used with other forms of isocyanurate modification to give improved friability in such foams, with little or no substantial loss of heat or flame resistance from the further modification. Thus, the silicon compounds may be used in combination with modifiers, such as polyols and organic plasticizers, such as long-chain fatty acids and esters, phosphates, etc.

The silicon compounds, such as the polysiloxanes, are employed at a level in polyisocyanurate trimer foams sufficient to reduce the friability and/or flame resistance for modified polyisocyanate foams to the level desired. I have found that in general, at levels of from about 4.0% to about 20% by weight of the total foam formulation, nonfriable highly flame-resistant and heat resistant polyisocyanurate foams are produced. Such foams are stable up to about 205° C. (400° F.), and exhibit good dimensional stability and humid aging characteristics. At concentration levels generally below 4%, the foam produced tends to be quite friable, while at levels above 20%, the foam produced tends to be too soft and loses its heat and flame-resistant properties. Although polysiloxane compounds with a hydroxyl number of less than 70 may be used, such compounds produce a more friable foam and require excessive concentration levels of the polysiloxane.

The organic surface-active silicon compounds useful in my invention may be used alone or in combination, and may be incorporated in either or all components of the foam formulation, depending on solubility; however, more generally are employed in the component containing the catalyst, blowing agent and modifiers, such as plasticizers, or other additives, such as flame or smoke-retardant additives. For the purpose of illustration only, my invention will be described in connection with a two-component formulation, with Part A containing the polyisocyanate and Part B in general the other components.

In one embodiment of my invention, improved properties of modified, but particularly in, trimerized polyisocyanurate foams are obtained by a balance of plasticizer and silicone concentrations of up to about 20% by weight in combination with levels of silicone in excess of about 4%, and typically 5 to 12%, with a plasticizer in excess of 1%; e.g., 1 to 15%, and typically 4 to 8%.

A wide variety of plasticizers may be used in my polyisocyanurate foams in combination with the silicone surfactant compounds. Such plasticizers are nonvolatile materials, such as high-boiling-point liquid organic plasticizers of the type useful in plasticizing urethane and vinyl-chloride resins. Typical plasticizers would include, but not be limited to, esters particularly such as phthalate esters based on $C_8$-$C_{13}$ oxo alcohols like dioctyl phthalate and 2-ethyl hexyl phthalate, diisodecyl phthalate, and other phthalate esters such as dibutyl phthalate.

Other plasticizers include esters of adipic, sebacic, trimellitates, azelaic, benzoic isobutyric and phosphoric acids like diisobutyl adipate, dioctyl adipate, dioctyl azelate. Other plasticizers include low-molecular weight polymeric and polyester plasticizers and epoxy plasticizers like epoxidized fatty materials like epoxidized soybean oil and linseed oil, as well as hydrocarbons like mineral oil. Typical plasticizers are set forth in the 1975-1976 edition of *Modern Plastics Encyclopedia*, pages 692-702, herein incorporated by reference.

My polyisocyanurate foamable compositions are typically two-component, one-shot, foamable compositions which, on mixing the component parts, provide for the reaction of the components into a polyisocyanurate foam product, either by its own heat exotherm or reaction, or, if desired, by the addition of external heat. One component may comprise an isocyanate compound, either aliphatic or aromatic, which term also includes isocyanate-terminated urethane prepolymers, as well as polyol and other modified polyisocyanurate prepolymers.

The isocyanate is subject to trimerization to a polyisocyanurate in the presence of a trimer catalyst. In particular, the preferred catalyst system is a combination of a major amount of a dialkylaminoalkyl phenol, such as dimethylaminomethyl phenol, and a minor amount of triethylene diamine in a cocatalyst system, as set forth in the copending U.S. patent application of Henry S. Hopkins, Jr., Ser. No. 596,367, filed July 16, 1975 (now U.S. Pat. No. 4,036,792, issued July 11, 1977).

The second component of the composition comprises the trimerization catalyst system, such as a tertiary amine metal salt or other trimer catalyst, either alone or in combination, and typically in an amount of from about 0.5 to 15% by weight. In addition, the second component includes an expanding amount of an inert blowing agent, typically a volatile low-boiling-point liquid compound, such as a hydrocarbon or halocarbon, which volatilizes during the trimerization exothermic reaction to produce the cellular foam structure, or a chemical blowing agent which decomposes by an in-situ generation of an inert gas. Typical blowing agents include, for example, a fluorine-containing lower alkene, such as difluoro dichloro methane or trichloro monofluoro methane or lower hydrocarbons like other well-known agents. Such blowing agents are often employed in an amount of from 0.5 to 15% by weight of the formulation. Other additives of the first, or preferably the second, component may include plasticizers, such as nonvolatile liquid esters, long-chain-like fatty acid esters, hydrocarbons, phosphates and the like, and other additives or modifying agents, such as flame and smoke-retardant additives, stabilizers, synergists, polyols, resins, fillers and the like. Plasticizers, such as dioctyl phthalate, may be employed in combination with the silicon compound in an amount of from 1 to 25% by weight.

A wide variety of organic isocyanates may be employed which are subject to trimerization which includes, but is not limited to: methylene bis phenyl isocyanate and its isomers and mixtures thereof; polymethylene polyphenyl polyisocyanate; meta or para phenylene diisocyanate; hexamethylene diisocyanate; toluene diisocyanate; diphenylmethane diisocyanate and the like. The silicon compound may be added to either or both components or added directly after mixing the two components. The process is carried out by simply mixing the components with the reaction occurring in the presence of the catalyst system at room temperatures (60°–80° F.) by virtue of the reaction exotherm.

My invention will be described and set forth for the purpose of illustration only in connection with the following examples; however, it is recognized and is a part of my invention that various substitutions and modifications can be made in the formulations and techniques without departing from the spirit and scope of my invention.

Various two-component (Parts A and B) foam formulations were prepared and the formulations tested and compared as regards friability, dimensional stability and heat and flame resistance employing generally acceptable test methods. The foams tested were prepared by admixing Parts A and B or the components of the formulation at room temperatures to provide for an exothermic reaction and the preparation of the foam.

In connection with the formulations set forth, the tradename compositions employed are more specifically identified as follows:

Mondur MR is a crude polymeric isocyanate of polymethylene polyphenyl diisocyanate from Mobay Chemical Co.
R-11-B is a blowing agent of fluorotrichloromethane.
DMP-30 is a tradename of Rohm & Haas Co. for tris-2,4,6-(N,N-dimethyl amino) methyl phenol used as a trimerization catalyst.
Dabco is a tradename of Air Products & Chemical, Inc. for triethylene diamine used as a supplemental trimerization catalyst.
DC-193 is a polysiloxane silicone-glycol copolymer surfactant of Dow Corning Co.
DOP is dioctyl phthalate employed as a plasticizer.
L-5420 is a tradename of Union Carbide Corp. for a polysiloxane silicone-glycol copolymer.

EXAMPLE 1

The following data will show the improved flame resistance and heat resistance of isocyanurates modified by my process as opposed to polyol or plasticizer modification.

| | FORMULATION FOR BUTLER CHIMNEY TESTS | | | | | | | | BUTLER CHIMNEY FORMULATION | | |
|---|---|---|---|---|---|---|---|---|---|---|---|
| Formulation | 1 | 2 | 3 | 4 | 5 | 6 | 7 | 8 | 9 | 10 | 11 |
| Mondur MR | 68 | 68 | 68 | 68 | 68 | 68 | 68 | 68 | 75 | 70 | 65 |
| R-11-B | 17 | 17 | 17 | 17 | 17 | 17 | 17 | 17 | 17 | 17 | 17 |
| DMP-30 | 5 | 5 | 5 | 5 | 5 | 5 | 5 | 5 | 6.0 | 6.0 | 6.0 |
| Dabco | 0.1 | 0.1 | 0.1 | 0.1 | 0.1 | 0.1 | 0.1 | 0.1 | 0.5 | 0.5 | 0.5 |
| DC-193 | 1 | 2 | 3 | 4 | 5 | 8 | 10 | 15 | 1.5 | 1.5 | 1.5 |
| D.O.P. | 9 | 8 | 7 | 6 | 5 | 2 | — | — | 0 | 5 | 10 |
| BUTLER CHIMNEY DATA | | | | | | | | | | | |
| % Wt. Retention | 91.2 | 93.6 | 94.6 | 93.9 | 92.1 | 94.2 | 93.6 | 93.2 | 94.6 | 94.3 | 91.0 |
| Flame Height (in.) | 10.0 | 9.5 | 8.7 | 7.8 | 8.5 | 5.7 | 6.3 | 5.8 | 6.6 | 7.1 | 10.0 |

| | BUTLER CHIMNEY FORMULATION | | | FORMULATIONS FOR BUTLER CHIMNEY | | | | | | | |
|---|---|---|---|---|---|---|---|---|---|---|---|
| Formulation | 12 | 13 | 14 | 15 | 16 | 17 | 18 | 19 | 20 | 21 | 22 |
| Mondur MR | 60 | 55 | 50 | 68 | 68 | 68 | 68 | 68 | 68 | 68 | 63 |
| R-11-B | 17 | 17 | 17 | 17 | 17 | 17 | 17 | 17 | 17 | 17 | 17 |
| DMP-30 | 6.0 | 6.0 | 6.0 | 5 | 5 | 5 | 5 | 5 | 5 | 5 | 5 |
| Dabco | 0.5 | 0.5 | 0.5 | 0.1 | 0.1 | 0.1 | 0.1 | 0.1 | 0.1 | 0.1 | 0.1 |
| DC-193 | 1.5 | 1.5 | 1.5 | | | | | | | | |
| L-5420 | | | | 1 | 2 | 3 | 4 | 5 | 8 | 10 | 15 |
| D.O.P. | 15 | 20 | 25 | 9 | 8 | 7 | 6 | 5 | 2 | — | — |
| BUTLER CHIMNEY DATA | | | | | | | | | | | |
| % Wt. Retention | 90.4 | 89.1 | 88.3 | 92.0 | 93.1 | 94.0 | 93.3 | 92.2 | 93.5 | 93.0 | 92.6 |
| Flame Height (in.) | 10.5 | 11.3 | 11.2 | 10.0 | 9.6 | 8.7 | 8.2 | 8.2 | 6.1 | 6.3 | 6.3 |

As can be seen from the above data, replacing dioctylphthalate by surfactant results in decreased flame height on the Butler Chimney test. In a similar experiment, increasing levels of dioctylphthalate resulted in increasing weight loss and higher flame heights.

EXAMPLE 2

| | HUMID AGING DATA, % VOLUME CHANGE 158° F., 100% Relative Humidity | | | | DRY HEAT AGING, 300° F. | | | | | | |
|---|---|---|---|---|---|---|---|---|---|---|---|
| | | | | | % VOLUME CHANGE | | | % WEIGHT CHANGE | | | |
| Formulation | 24 hrs | 28 hrs | 7 days | 17 days | 24 hrs | 3 days | 7 days | 24 hrs | 3 days | 7 days | |
| 1 | 8.7 | 9.1 | 9.2 | 9.3 | 8.1 | 8.1 | 9.5 | 4.4 | 4.8 | 4.4 | DC-193 |
| 2 | 8.4 | 8.8 | 9.4 | 9.1 | 7.0 | 7.8 | 8.5 | 4.0 | 4.0 | 4.1 | |
| 3 | 9.1 | 9.5 | 9.1 | 9.5 | 6.0 | 6.5 | 6.7 | 3.9 | 4.2 | 3.7 | |

-continued

| Formulation | HUMID AGING DATA, % VOLUME CHANGE 158° F., 100% Relative Humidity | | | | DRY HEAT AGING, 300° F. | | | | | | |
|---|---|---|---|---|---|---|---|---|---|---|---|
| | | | | | % VOLUME CHANGE | | | % WEIGHT CHANGE | | | |
| | 24 hrs | 28 hrs | 7 days | 17 days | 24 hrs | 3 days | 7 days | 24 hrs | 3 days | 7 days | |
| 4 | 9.1 | 9.5 | 9.8 | 9.8 | 6.1 | 7.8 | 6.1 | 1.9 | 2.4 | 3.6 | |
| 5 | 9.1 | 9.6 | 9.8 | 9.9 | 6.6 | 8.2 | 7.0 | 2.1 | 2.8 | 3.3 | |
| 6 | 8.7 | 9.1 | 9.1 | 8.6 | 5.2 | 6.1 | 6.4 | 2.1 | 2.4 | 3.0 | |
| 7 | 6.1 | 6.2 | 6.5 | 6.0 | 6.8 | 7.4 | 7.3 | 2.0 | 2.6 | 2.8 | |
| 8 | 5.4 | 5.5 | 5.8 | 5.7 | 6.6 | 6.7 | 6.8 | 5.2 | 5.2 | 5.2 | |
| 9 | 10.0 | 10.5 | 10.7 | 10.7 | 1.9 | 3.8 | 4.2 | 1.1 | 2.6 | 5.9 | D.O.P. |
| 10 | 9.0 | 9.1 | 11.4 | 10.5 | 2.4 | 5.0 | 6.2 | 1.5 | 3.0 | 6.1 | |
| 11 | 8.3 | 8.2 | 7.8 | 7.7 | 6.5 | 6.8 | 7.3 | 3.8 | 5.4 | 10.3 | |
| 12 | 7.8 | 7.7 | 9.3 | 6.5 | 4.5 | 4.3 | 5.0 | 8.9 | 16.7 | 25.2 | |
| 13 | 14.2 | 13.1 | 2.9 | 1.6 | 4.0 | −2.1 | −5.0 | 8.1 | 17.6 | 26.3 | |
| 14 | 13.0 | 10.2 | 0.2 | 1.6 | 3.0 | −8.9 | −10.2 | 10.2 | 20.6 | 30.3 | |
| 15 | 8.2 | 8.3 | 9.9 | 10.0 | 4.6 | 5.3 | 7.1 | 3.5 | 5.2 | 7.2 | L-5420 |
| 16 | 7.1 | 7.5 | 7.9 | 7.8 | 8.0 | 8.6 | 8.3 | 3.6 | 5.2 | 6.9 | |
| 17 | 7.5 | 8.5 | 8.9 | 8.8 | 8.8 | 9.1 | 9.8 | 3.6 | 6.1 | 7.9 | |
| 18 | 9.2 | 11.2 | 13.0 | 13.1 | 5.3 | 6.0 | 9.3 | 2.6 | 3.6 | 4.7 | |
| 19 | 7.0 | 8.0 | 11.3 | 11.2 | 3.7 | 4.0 | 9.0 | 2.3 | 4.7 | 7.1 | |
| 20 | 8.1 | 9.0 | 9.9 | 9.1 | 7.2 | 7.5 | 9.1 | 1.8 | 3.0 | 4.1 | |
| 21 | 6.6 | 7.6 | 8.8 | 8.8 | 2.5 | 2.3 | 6.9 | −.7 | 2.9 | 3.2 | |
| 22 | 4.5 | 5.5 | 6.5 | 6.6 | 6.1 | 7.0 | 8.5 | 1.8 | 3.9 | 6.0 | |

As can be seen from the above data, isocyanurates modified with surfactants show better dimensional stability and greater weight retention than foams modified with dioctylphthalate. The above data can be compared with the following data for isocyanurates modified with polyol:

| Formulation Index | Humid Aging 158° F., 100% R.H. | | Dry Heat Aging 300° F. % Vol Change | | Dry Heat Aging 300° F. % Wt. Loss | |
|---|---|---|---|---|---|---|
| | 24 hrs | 7 days | 24 hrs | 5 days | 24 hrs | 5 days |
| 250 | 8.9 | 8.9 | 10.1 | 22.0 | 3.0 | 5.7 |
| 500 | 6.0 | 6.0 | 12.3 | 15.9 | 3.2 | 5.2 |
| 750 | 8.4 | 9.5 | 22.8 | 13.0 | 4.4 | 7.1 |
| 1000 | 6.2 | 6.3 | 10.8 | 27.6 | 4.7 | 8.5 |

Surfactant modified polyols show much better dimensional stability than isocyanurates modified by polyol or plasticizer. In all of the above data, the density of the foams were between 1.70 and 1.95 pounds per cubic foot.

EXAMPLE 3

The following data illustrates that surfactant polysiloxane compounds provide polyisocyanurate foams of unexpected and improved friability and brittleness properties.

| | Parts by Weight of Components | | | | | | |
|---|---|---|---|---|---|---|---|
| | Formulation | | | | | | |
| Mondur MR | 68 | 68 | 68 | 68 | 68 | 68 | 68 |
| R-11-B | 17 | 17 | 17 | 17 | 17 | 17 | 17 |
| DMP-30 | 5 | 5 | 5 | 5 | 5 | 5 | 5 |
| DABCO | .15 | .15 | .15 | .15 | .15 | .15 | .15 |
| Silicone (DC-193) (L-5420) | 1 | 2 | 4 | 6 | 10 | 15 | 20 |
| | Test Data | | | | | | |
| friability* | 1 | 1 | 3 | 6 | 8 | 8 | 9 |
| brittleness* | 1 | 1 | 1 | 4 | 5 | 5 | 8 |
| Butler Chim. | (all show - 93 Wt. % retention and 6 to 7-inch flame height) | | | | | | |

As can be seen from the test data, improvement of friability is significant as the silicone level approaches about 6 to 10% by weight. A corresponding improvement in polymer brittleness occurs at relatively high levels approaching 20% by weight silicone addition. By balancing silicone/plasticizer addition at approximately 6 to 10% silicone and 4 to 8% plasticizer, an economically practical balance can be made among friability, brittleness, flammability character, and dimensional stability. The other examples show the improvement in hydrolytic dimensional stability when silicones are used to replace or partially replace plasticizer concentrations.

What I claim is:

1. In a process of preparing a plasticized polyisocyanurate trimer foam characterized by improved friability and brittleness and having good flame, heat and stability properties, the process which comprises reacting a polyisocyanate in the presence of a catalytic amount of a trimerization catalyst and a foam expanding amount of an inert blowing agent in a foamable composition, to provide a rigid polyisocyanurate trimer foam which consists essentially of recurring cross-linked isocyanurate groups, the improvement which comprises:
carrying out the reaction in the presence of from about 4% to 20% by weight of the foam formulation of a surface active organic silicone compound characterized by an active hydrogen functionality, and having a hydroxyl number of greater than about 50 and an equivalent weight of less than about 2000 and a plasticizing amount of a nonvolatile organic plasticizer.

2. The rigid polyisocyanurate trimer foam product produced by the process of claim 1.

3. The process of claim 1 wherein the plasticizer comprises a long-chain fatty-acid ester plasticizer compound.

4. The process of claim 1 wherein the plasticizer compound comprises phthalate esters based on $C_8$-$C_{13}$ oxo alcohols.

5. The process of claim 1 wherein the plasticizing amount comprises from about 1% to 15% by weight of the foam formulation.

6. The process of claim 1 wherein the plasticizing amount comprises from about 4% to 8% by weight of the foam formulation, and the silicone compound comprises from about 6% to 10% by weight of the foam formulation.

7. The process of claim 6 wherein the plasticizer compound is an organic ester plasticizer, and the silicone compound is a polysiloxane silicone-glycol copolymer surfactant compound.

8. The process of claim 1 wherein the catalyst comprises a cocatalyst system which comprises a major amount of a dialkylamine alkylphenol and a minor amount of a triethylene diamine.

9. The process of claim 1 wherein the blowing agent comprises an inert, volatile, liquid fluorine-containing, lower alkylane or a liquid hydrocarbon in an amount of from about 0.5% to 15% by weight of the foam formulation, which blowing agent volatilizes during the reaction, to provide the rigid polyisocyanurate trimer foam.

10. The process of claim 1 wherein the polyisocyanate comprises an organic diisocyanate compound.

11. The process of claim 1 wherein the polyisocyanate comprises a polymethylene polyphenyl diisocyanate.

12. The process of claim 1 wherein the polyisocyanate compound comprises an isocyanate-terminated urethane prepolymer or a polyol-modified polyisocyanate prepolymer.

13. The process of claim 1 wherein the silicone compound comprises a polysiloxane compound which is soluble in the polyisocyanate compound.

14. The process of claim 1 wherein the silicone compound comprises a nonhydrolyzable polysiloxane compound having carbon-to-silicone bonds.

15. The process of claim 1 wherein the silicone compound comprises a silicone polyether copolymer comprising a methyl polysiloxane and a $C_2$–$C_3$ polyoxyalkylene polyol.

16. The process of claim 1 wherein the silicone compound comprises a polyoxyalkylene polysiloxane compound having an average molecular weight of from about 300 to 3000 and having polyethylene or polypropylene oxide ether groups.

17. The process of claim 1 wherein the silicone compound has a hydroxyl number of from about 70 to 120.

18. The process of claim 1 wherein the silicone compound has an equivalent weight of from about 450 to 800.

19. The rigid polyisocyanurate trimer foam product produced by the process of claim 6.

20. In a process of preparing a polyisocyanurate trimer foam characterized by improved friability and brittleness and having good flame, heat and stability properties, the process which comprises reacting a polyisocyanate foam in the presence of a catalytic amount of a trimerization catalyst and a foam-expanding amount of an inert blowing agent in a foamable composition, to provide a rigid polyisocyanurate trimer foam which consists essentially of recurring cross-linked isocyanurate groups, the improvement which comprises:

carrying out the reaction in the presence of from about 6% to 20% by weight of the foam formulation of a surface-active organic silicone compound comprising a polysiloxane silicone-glycol copolymer surfactant having a molecular weight of from about 300 to 3000, and characterized by an active hydrogen functionality and having a hydroxyl number of greater than about 50 and an equivalent weight of less than about 2000 and a plasticizing amount of from about 1 to 15 percent by weight of a nonvolatile organic plasticizer.

21. The rigid polyisocyanurate trimer foam product produced by the process of claim 20.

* * * * *